Jan. 3, 1961  D. GRUDIN  2,966,808
POWER ACTUATED HINGE DEVICE
Filed Dec. 23, 1958  6 Sheets-Sheet 1

INVENTOR.
DANIEL GRUDIN
BY
*Godfrey B Spier*
ATTORNEY

Jan. 3, 1961          D. GRUDIN          2,966,808

POWER ACTUATED HINGE DEVICE

Filed Dec. 23, 1958          6 Sheets-Sheet 2

INVENTOR.
DANIEL GRUDIN
BY
Godfrey D. Speir
ATTORNEY

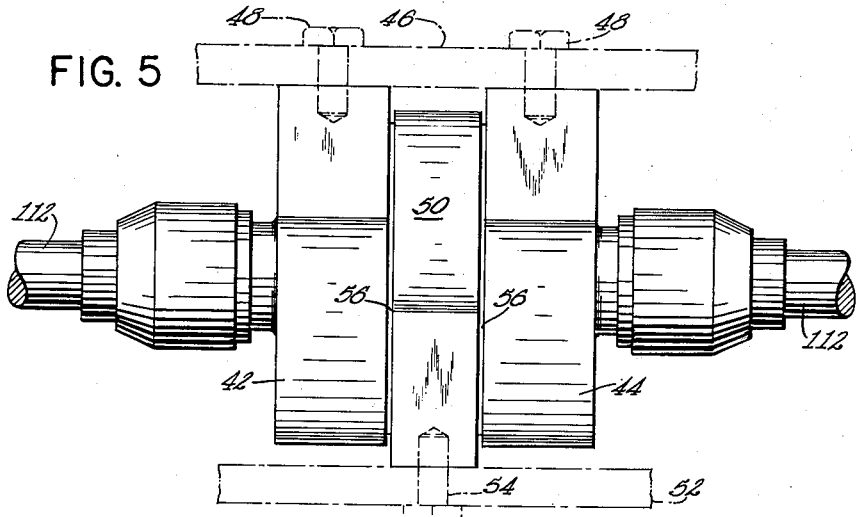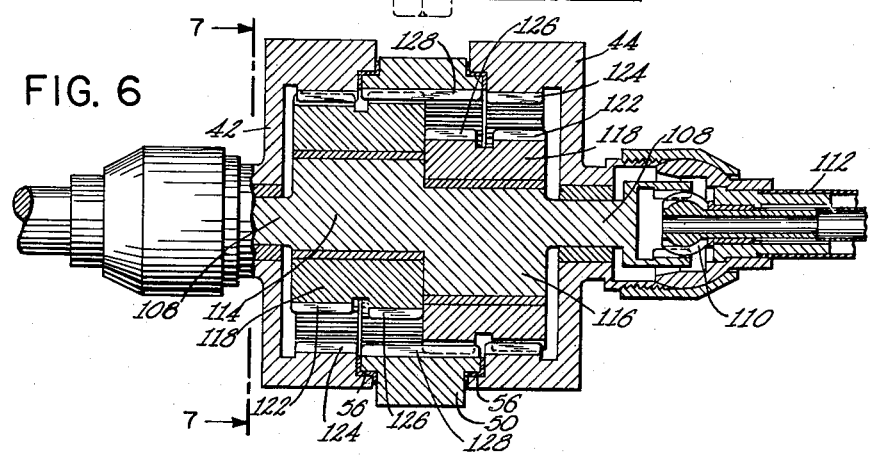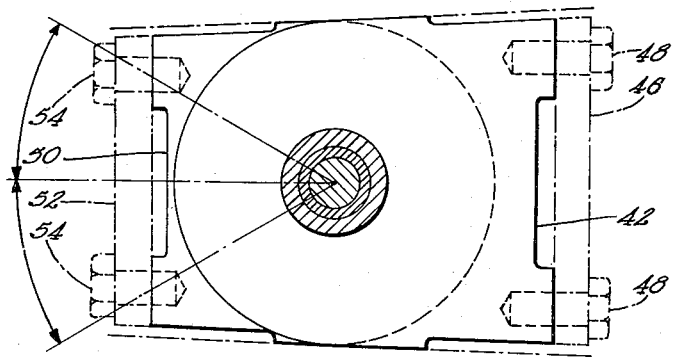

Jan. 3, 1961 D. GRUDIN 2,966,808
POWER ACTUATED HINGE DEVICE
Filed Dec. 23, 1958 6 Sheets-Sheet 5

INVENTOR.
DANIEL GRUDIN
BY
ATTORNEY

Jan. 3, 1961 D. GRUDIN 2,966,808
POWER ACTUATED HINGE DEVICE
Filed Dec. 23, 1958 6 Sheets-Sheet 6
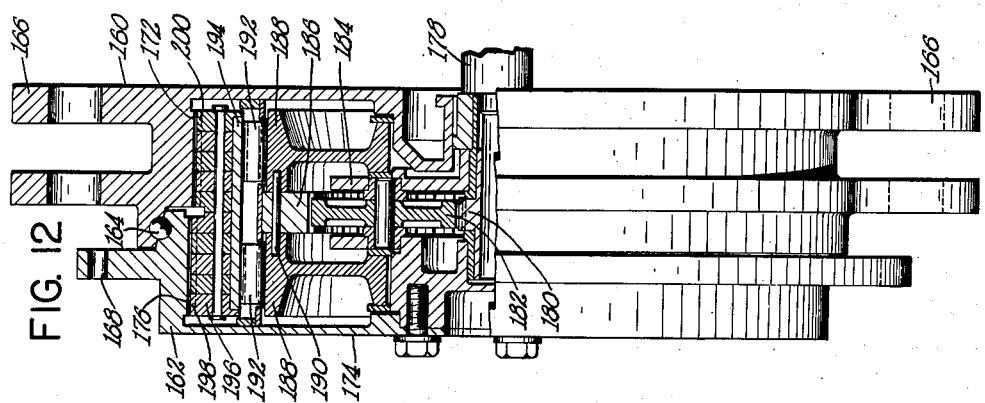
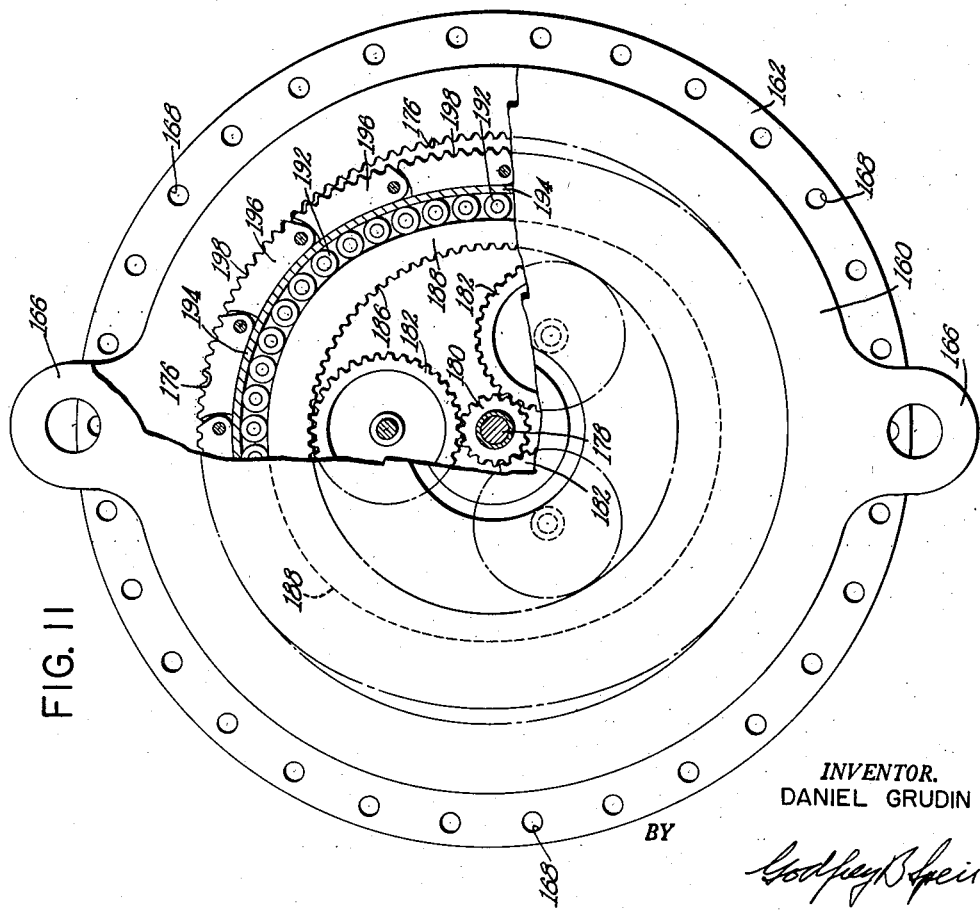
INVENTOR.
DANIEL GRUDIN
BY
ATTORNEY

United States Patent Office

2,966,808
Patented Jan. 3, 1961

2,966,808

POWER ACTUATED HINGE DEVICE

Daniel Grudin, Rockaway, N.J., assignor to Curtiss-Wright Corporation, a corporation of Delaware Filed Dec. 23, 1958, Ser. No. 782,537

8 Claims. (Cl. 74—640)

This invention relates to power driven hinge devices and to rotary or oscillatory actuators. In general, the mechanism comprises one or more fixed annular members to which one or more movable annular members are secured on bearings so that the movable annular members may move or oscillate relative to the fixed members. Further, these annular members contain driving mechanism which, by the appropriate application of rotary or oscillating mechanical power thereto, enforces rotation or oscillation of the movable members relative to the fixed members.

Such a mechanism provides what might be termed a Power Hinge for the support and movement of heavy loads such as closures, aircraft components, and any other structures which are either heavy in themselves or are burdened by strong forces. Conventional practice in mounting a heavily loaded member for hinging and oscillatory movement has been to provide one or more, substantially conventional hinges supporting the member, with a power operated push-pull device attached to the member, the push-pull device being reciprocated to oscillate the member about the hinge axis. An advantage in the present invention resides in the coordination of hinge and power actuating assemblies in a single mechanism, enabling material saving in both complexity, weight and cost in a hinge system. By virtue of relatively large diameter hinges, as compared with conventional hinges, not only is the member adequately supported, but also, large amounts of torque can be applied to the loaded member to cause its movement, directly at the hinge, without having protuberant additional mechanisms. The arrangements of the invention can readily be sealed to contain lubricant and to exclude contaminants, avoiding exposed hinge and actuating bearings and the like. Further, the invention is adaptable to operation in elevated or low temperature environments.

The invention in one of its forms as will be described may also comprise a rotary or oscillatory actuator whereby rotary or oscillating input motion can be converted to the same kind of motion, but at a greatly reduced speed and greatly increased torque capacity.

An object of the invention is to provide a power actuated hinge having high load supporting and torque capacity and also having the capability of ganging to support large loads over a long span, wherein a large plurality of hinge points and shear planes are provided. This enables not only the support and movement of a large load but also enables the distribution of the load over large number of spaced-apart points of load support.

A further object of the invention is to provide a power transmission mechanism within a hinge or actuator assembly by which high-speed, low-torque mechanical motion may be transformed to low-speed, high-torque mechanical motion. A further object of the invention is to provide a power conversion mechanism whose efficiency is high and whose loads are well distributed, to avoid adverse high stress in elements of the structure and to minimize friction losses therein. A further object of the invention is to provide a rotary or oscillatory speed reducer mechanism of modified epicyclic type which will have high reduction and high efficiency.

An understanding of the nature of the invention may be gained by viewing the annexed drawings in connection with the following detailed description. The embodiments of the invention shown are exemplary to illustrate the principles of the invention and are not to be construed as limiting its scope. A skillful designer will doubtless find design modifications suitable for his purposes while following the broad principles disclosed.

In the drawings:

Fig. 5 is a plan of an alternative power actuated hinge device arrangement;

Fig. 6 is an axial section through the hinge of Fig. 5;

Fig. 7 is an end elevation on the line 7—7 of Fig. 6;

Fig. 11 is an end elevation, partly in section, of a rotary actuator of alternative form;

Fig. 12 is a side elevation, partly in section, of the arrangement of Fig. 11

Referring first to Figs. 1–4, an annular member 12 is sandwiched between two annular members 14 and 16. Anti-friction or other forms of bearings 18 are disposed between the member 12 and 14, and between the member 12 and 16. These bearings are secured in the members to permit relative rotation of the member 12 to the members 14 and 16 and also to enable the support of the member 12 and loads associated therewith upon the members 14 and 16. In effect the two bearings 18 provide two shear planes to enable support of the load over a relatively large diameter whereby the load may move freely relative to the fixed members about the axis of the hinge, but is securely held against radial or axial movement.

Figure 2:
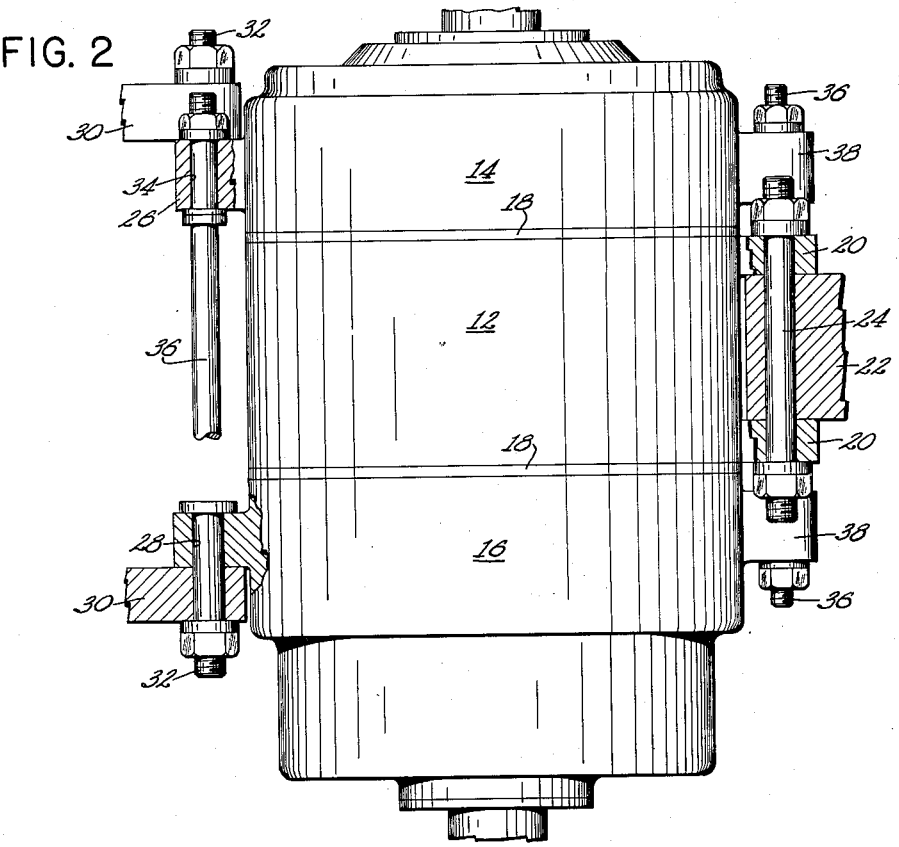
Fig. 2 is a plan of the power actuated hinge device including attachment arrangements therefor.
Figure 3:
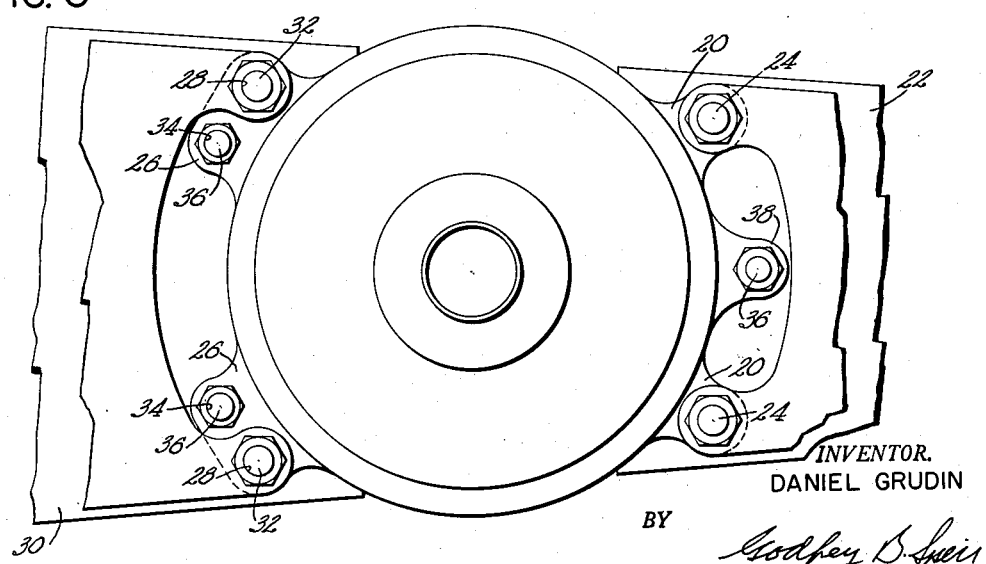
Fig. 3 is an end elevation of the hinge of Fig. 2 showing fixed and movable members associated with the hinge.

Referring to Figs. 2 and 3, the member 12 is provided with ears 20 on one side thereof to which a load 22 is secured as by bolts 24. The members 14 and 16 are provided with ears 26 each of which extends around the members a sufficient distance so that two sets of openings may be provided therein. One set of openings 28 enables attachment of the hinge to a support structure 30 as by bolts 32. The other set of holes 34 in the ears 26 provide attachment points for bolts 36 which hold the elements 14 and 16 in the axially spaced relationship needed to properly support the member 12. On the opposite sides of the members 14 and 16, additional ears 38 are provided to receive another bolt 36 for holding the members 14 and 16 in spaced relationship. It will be seen in Fig. 3 that the ears 38 lie between the ears 20 of the member 12, so that the member 12 and its load 22 may oscillate up or down through a substantial angle without interfering with the ears 38 and their bolt 32. The dimensioning of these attachment elements may, of course, be varied to permit greater or less angular movement of the member 12 and its load 22 as may be desired.

Before delineating the drive mechanism for the hinge of Figs. 1–4, reference will be made to Figs. 5–7, which is a power actuated hinge system much like that of Figs. 1–4 except that it utilizes a different type of power-drive mechanism. Figs. 5–7 include fixed annular elements 42 and 44, secured to a structure 46 as with bolts 48. These elements embrace a movable annular member 50 secured to a movable load 52 as by bolts 54. The member 50 is borne in the members 42 and 44 as by bearings 56.

Now reverting to Figs. 1–4 the end of the member 14 is formed as a closure 60 having a bearing 62 which supports one end of a high-speed power input shaft 64. The member 16 also has an end closure 66 provided with a bearing 68 supporting the other end of the input shaft 64. Within the member 16, at its end, is a compound planetary speed reducer 70 comprising a spider 72 on which are journalled co-rotating planet pinions 74 and 76. Pinions 76 mesh with a drive pinion 78 on the shaft 64 and also mesh with a fixed ring gear 80 formed in the member 16. Rotation of the drive shaft 64 causes the planet spider to rotate. Pinions 74 engage a ring gear 82, whose pitch diameter is different from that of the ring gear 80, whereby the ring gear 82 is forced to rotate at a speed which is considerably reduced from that of the shaft 64. The ring gear 82 is integral with a multiple lobe cam drum 84 which is carried in bearings 85 and 86 in the covers of the respective members 16 and 14. This cam 84 extends lengthwise of the hinge assembly and bridges the three members 12, 14 and 16. Now, referring to Figs. 1 and 4 together, the cam 84 is embraced by a roller bearing assembly 88 co-extensive in length with the cam. Around the bearing is a thin flexible, hardened metallic sleeve 89 which holds the roller bearing in contact with the cam and acts as an outer race for the bearing. The bearing rollers are assembled with respect to one another by a yielding retainer 90 so that as the band 89 rotates relative to the cam, both the rollers and the band accommodate to the cam profile.

The bore of the annular member 12 is formed as a ring gear 91 whose teeth are designated at 92. Likewise the bores of the members 14 and 16 are formed as similar ring gears 93 whose teeth are designated at 94. The number of teeth and also the pitch diameter of the gears 91 and 93 are slightly different. Between the gears 91 and 93 and the band 89 are a plurality of segmental pieces 96 disposed in end-to-end relationship and bridging all of the ring gear teeth 92 and 94. These segments articulate with respect to each other as they move as a result of rotation of the cam 84. Segment teeth 98, which engage the ring gear teeth 92 have substantially the same circular pitch as the teeth of the gear 91. Likewise segment teeth 100 at the ends of the segments which engage the ring gear 93 have the same circular pitch as the teeth 94. Due to the differential circular pitch of the gear teeth 92 and 94 and the corresponding differential circular pitch of the segments, the member 12 is rotated or oscillated with respect to the members 14 and 16 as the cam 84 rotates and as the teeth of active segments engage respective ring gears.

Figure 4:
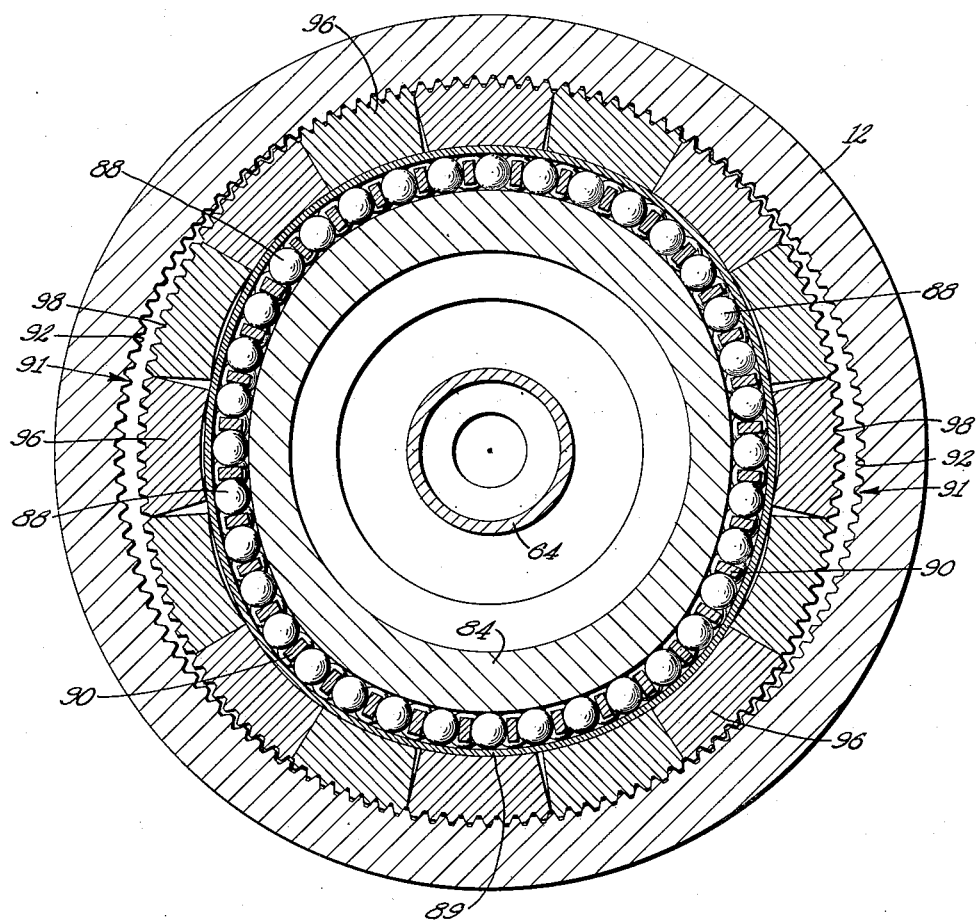
Fig. 4 is a typical section on the line 4—4 of Fig. 1.

Referring to Fig. 4 it should be pointed out that the aggregate number of teeth in segments 96 is less than the aggregate number of teeth in the embracing ring gears. As shown, the cam 84 is shown as being of more or less elliptical form, in other words it has two lobes. These lobes enforce diametrically opposite engagement of segment teeth with the ring gears, and the cam portions between the lobes enable escape and spacing of the segment teeth from the ring gears. As the cam 84 rotates, the segments are all endowed with an orbital motion at a lesser rate of rotation than that of the cam, through the roller bearing 88. Due to the differential numbers of teeth between the ring gears and the respective segment parts, slow rotation of the member 12 relative to the fixed members 14 and 16 occurs while the cam rotates at a relatively high speed. The ratio of reduction is established by the numbers of the teeth in the ring gears and in the segments.

For purpose of analogy, this arrangement may be thought of as a compound epicyclic gear train where the planet pinions are very large with respect to their embracing ring gears and where the planet pinions, if distorted to oval form, would have two points of engagement with the ring gears. This system enables torsional balance of the load, whereby the embracing members are subject to a torsional couple to complete their action and reaction. Furthermore, it will be seen that as the segments accomplish their orbital movement, they act as balanced load-carrying beams supported at their ends by the fixed ring gears 93 and effecting movement of the centrally located ring gear 91. The balance of the torque producing forces thereby enables the system to operate at maximum efficiency with a minimum of distortion in the system.

The shape of the cam 86, as shown in Fig. 4, provides upper and lower arcuate portions which enforce the upper and lower active segments to an effective pitch diameter to enable high reduction ratio. The sides of the cam 84 are relieved on arcs of much larger radius to enable the teeth on the segments to escape the teeth on the ring gears and to enable transition of segment teeth past ring gear teeth as the segments move in an orbit.

The arrangement of the invention, as shown and described, depending upon tooth numbers in the ring gears and segments, can yield reduction ratios from over one hundred to one, to upwards of eight hundred to one. For instance, an arrangement where the ring gears might have one hundred and one, and ninety teeth, and wherein there are eleven segments, the segments each having eight teeth for engagement with one ring gear and nine teeth for engagement with the other ring gears would produce a ratio of four hundred and four turns of the cam 88 to one full turn of the driven member 12.

There are two modes of constructing the segments. All the segments may be uniform, each having a whole number of teeth for engagement with the ring gear 91 and a whole number of teeth for engagement of the ring gears 93 with these two whole numbers aggregating to the same length. In this event, the ratio of the system is controlled by the numbers of teeth 98 and 100 in each segment in conjunction with the numbers of ring gear teeth.

Alternatively the successive segments may be arranged in sets of two or more wherein there is a one-tooth difference between the two rows of teeth of each set. For instance, if there were a two-segment set, the total number of teeth 98 for two segments would differ by one tooth from the total number of teeth 100 for two segments. This enables a higher reduction ratio to be obtained in the assembly. As an example, suppose there are twelve segments in the mechanism arranged as four sets of three each. Each set might comprise thirty teeth 98 and thirty-one teeth 100. Ring gears might have, respectively, one hundred and twenty-two and one hundred and twenty-six teeth. This would yield a reduction ratio of eighteen hundred and ninety, to one.

Figure 13:
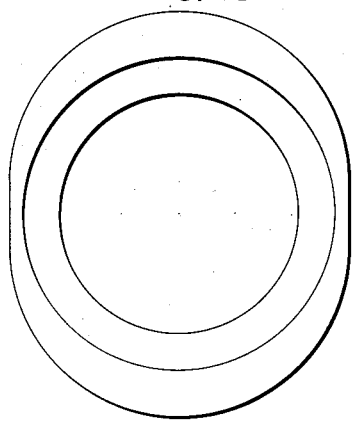
Fig. 13 is an end view of an alternative type of cam appropriate for use with the arrangements of Figs. 4 or 11.

The cam 84 may be constructed with more than two lobes, enabling a correspondingly larger number of tooth contacts for division and sharing of the load over a plurality of teeth. Alternatively the cam may be shaped as in Fig. 13, with arcs and tangents, the arcs being chosen to hold the toothed segments engaged at times with the ring gears. In some cases, the cam could be replaced by opposed rollers over which linked segments run. In such an arrangement, roller bearings like 88 could be omitted.

The ratio determination of a segment system of this sort follows the pattern of ratio determination of a compound planetary gear set. For instance, the following formula is applicable:

$$R = \frac{AD}{AD - BC}$$

wherein: A is the number of teeth in one ring gear. B is the number of teeth in a segment or segment set engageable with A. C is the number of teeth in the other ring gear. D is the number of teeth in a segment or segment set engageable with C.

The segments 96 are securely held in end-to-end engagement with one another. One means for this purpose comprises spring bands 104 (Fig. 1) embracing the segments and disposed in grooves formed in the outer surfaces of the segments between the sets of teeth 98 and 100. Alternatively, the segments may be linked together in the form of a chain. A chain arrangement is shown in Fig. 11 which will be further described. When the segments are arranged as a chain, the link pivots are laid out in such fashion that when the segments are engaged with the co-acting ring gears, the circular pitch between the last tooth on one segment and the first tooth on the next segment is equal to the circular pitch of other teeth on the segments. For this purpose, the pivots may lie close to the outer run of the segments, close to the inner run of the segments, or intermediate the height of the segments.

Figure 1:
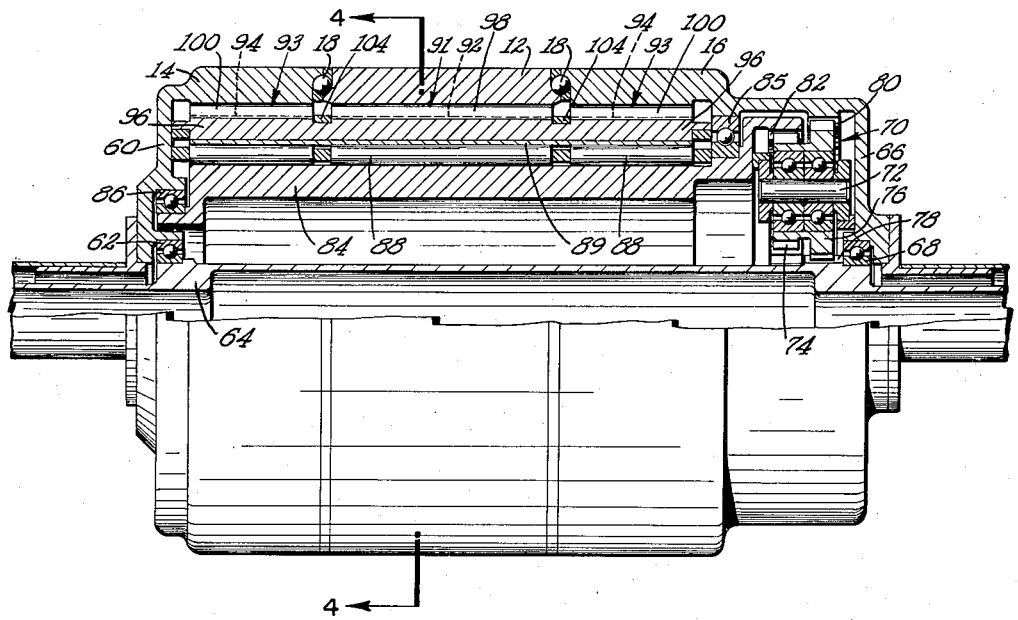
Fig. 1 is an axial section through one embodiment of a power actuated hinge device.

In Fig. 1, the compound planetary speed reducer 70 is optional and may be used at times to provide a higher over-all reduction ratio than may be feasible with the segmental reduction unit alone. If the speed reducer 70 is not used the cam 84 may be directly driven by the power input shaft 64.

Referring now to Figs. 5, 6, and 7, the general construction for the multiple shear hinge therein has already been described. The drive mechanism in this embodiment comprises a dual, compound planetary gear set whereby the member 50 is driven relative to both of the support members 42 and 44, concurrently with axial, radial and twisting support of the member 50 between the members 42 and 44. The power input comprises a shaft 108 journalled in the members 42 and 44, this being driven, if desired, through universal couplings 110 from shaft 112. Shaft 108 includes two eccentric journals offset from one another by an angle of 180°. The eccentricity of the left hand journal 114 is the same as the eccentricity of the right hand journal 116, and the two journals each overlap half of the driven member 50. The two journals each carry a compound planet pinion 118, each pinion having two sets of teeth, 122, engaging ring gear teeth 124 on members 42 and 44, and 126, engaging ring gear teeth 128 on the member 50. The number of teeth on the two ring gears differs slightly, as does the number of teeth 122 and 126, in order to have a reduction ratio drive between members 42 and 44, and 50, as the shaft 108 is rotated. With rotation of the shaft 108 the pinions 118 turn on the eccentric journals 114 and 116, the teeth 122 reacting against ring gear teeth 124, and the teeth 126 driving the teeth 128 to turn the member 50 at low rotational speed relative to the speed of the input shaft 108. This drive mechanism utilizes the principle of a conventional compound planetary system and follows the laws thereof as to ratio determination.

Numerous other sorts of speed reduction gearing may be housed within the tandem stationary and movable end members of the power actuated hinge devices described. Such other types of reduction gearing could include friction drive devices and, notch and pin differential motion devices, for a multiplicity of pinions following the general philosophy of Fig. 6. With any type of drive mechanism it is preferable, as has been disclosed, for the power input drive to apply pure torque to the drive mechanism, and to carry the load torque reaction from the movable hinge member directly to the adjacent stationary members. As implied previously it is also desirable in any embodiment of a power actuated hinge device to provide bearing arrangements between the tandem fixed and movable members which will sustain the full shear, axial, and twisting loads on the movable member, imposing only torsional loading on the power gearing within the hinge members.

Figure 8:
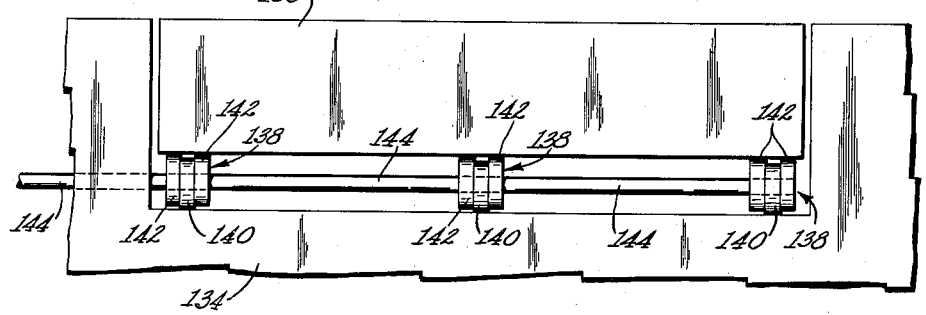
Fig. 8 is a plan of a structural assembly showing a typical installation of power actuated hinge devices.
Figure 9:
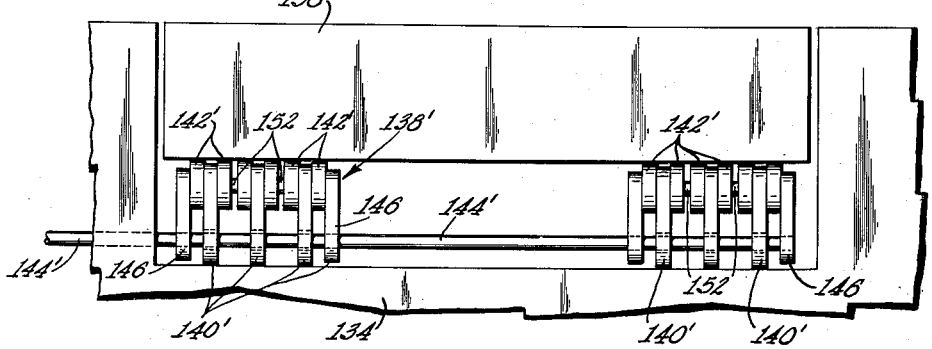
Fig. 9 is another plan of a structural arrangement showing an alternative arrangement of power actuated hinge devices.
Figure 10:
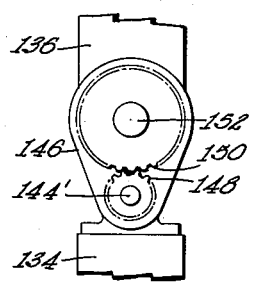
Fig. 10 is a section on the line 10—10 of Fig. 9.

Figs. 8-10 show typical installations of plural power actuated hinge devices. Supporting structure is represented at 134 to which a loaded flap, door or other arrangement 136 is secured for swinging or oscillating movement. In Fig. 8 three similar power actuated hinge devices 138 are shown, each comprising stationary elements 140 secured to the support 134 and each comprising tandem elements 142 bordering the elements 140 and secured to the flap 136. As previously described the elements 140 and 142 are hollow annular members journalled relative to one another and containing speed reducer mechanisms. A common power drive 144 extends centrally through all of the power actuated hinge devices 138 to drive them in unison. As the load conditions warrant, a larger or lesser number of power actuated hinge devices may be used, all, preferably being driven by the common power input 144. By using a common power input, all hinges operate in unison to drive the load and each power actuated hinge device assumes a substantially equal fraction of the load.

In the arrangement of Fig. 9, the power actuated hinge device units are multiplied in number and carry the same reference characters as in Fig. 8, except that these reference characters are primed. In this instance, it is presumed that a higher reduction ratio may be desired between the power input shaft 144' and the hinges 138'. Accordingly, the shaft 144' is run through apertures in elements 140' and is connected to the hinges 138' by gear units 146. Such gear units might comprise simple spur gearing, including a small gear 148 on the shaft 144' and a larger gear 150 co-axial with the power actuated hinge devices. The shaft 152 on which the large gears 150 are mounted passes through the several power actuated hinge devices to drive all of them.

Should it be necesary or desirable to do so, power actuated hinge devices may be arranged in tandem, solidly, along the entire span of the flap 136.

Figs. 11 and 12 show an alternative arrangement of power actuated hinge devices or rotary actuator wherein the double shear arrangement in prior embodiments is omitted. In this arrangement we show a fixed member 160 and a movable member 162, pivoted relative to one another by a bearing 164. Members 160 and 162 are respectively provided with ears 166 and 168 for attachment to supporting and moving structures or elements.

The member 160 is formed with an end closure 170 an internal gear teeth 172, while the member 162 is provided with an end closure 174 and internal gear teeth 176. A power input shaft 178 enters near the center of the member 160, is borne thereby, and carries a drive pinion 180 meshed with planet pinions 182 journalled on a planet carrier 184, journalled in turn on bushings on the shaft 178. A ring gear 186 embraces and is meshed with the planets 182, this ring gear 186 on its exterior surface comprising a multilobed cam. On each side of the element 186, similar cams 188 are secured as by dowels 190. Bearing rollers 192 embrace the cams 180 and are in turn embraced by a resilient steel band 194 which holds the rollers against the cams. Around the exterior of the ring 194 interlinked segments are assembled in the form of a chain, these segments either being solid in an axial direction or being laminated as indicated in Fig. 12. The outer runs of the segments which are co-planar with the gear 176 are toothed at 198 to match with that gear, while the outer runs of the segments which are co-planar with the gear 172 are toothed at 200 and mesh with the gear 172. The number of teeth in the ring gears 172 and 176 differ, and the number of teeth 198 and 200 in the segments differ correspondingly, according to the principles previously described, in order to secure a large reduction ratio between rotation of the cam 186 and the movable member 162.

The embodiment shown in Figs. 11 and 12 is primarily a rotary actuator where the predominant loads on the mechanism are torsional, and where the shear and axial loading on the mechanism is moderate. As will be noted, this is a single shear assembly and while it may be designed with considerable ruggedness, it would not be as efficient as the multiple shear arrangements previously described for the balanced support of heavy loads on the movable member.

In connection with the speed reducers in Figs. 1–4 and 11 and 12, the design of components can be contrived to eliminate the resilient race bands 89 and 194. Modification of components is also possible in the use of helical gears and segments, and in adapting the segments for uniformity throughout their length—that is, the same number of teeth in the center portion as in the end portions. Considerable ingenuity also may be exercised in the choice of optimum tooth forms and effective pitch radii to enable the concurrent engagement of several consecutive teeth between segments and ring gears, to augment load capacity, while still allowing engagement and disengagement of teeth without mutual interference.

Having described several embodiments for arrangements of the invention it will be clear that considerable latitude in design may be exercised while still utilizing the principles of the invention.

I claim:

1. A rotary mechanism comprising a substantially cylindrical reaction member and a substantially cylindrical output member concentric therewith, means journalling one member on the other at their peripheries to provide a strong articulating joint therebetween and enabling relative oscillation thereof, an oscillatable input shaft substantially concentric with said members, and gearing connecting said shaft and both members whereby shaft oscillation enforces relative oscillation of said members, said gearing including a plurality of serially arranged elements engageable with both of said members, and means to enforce driving engagement of a plurality of elements with said members at circumferentially spaced portions thereof.

2. A rotary mechanism comprising a substantially cylindrical reaction member and a substantially cylindrical output member concentric therewith, means journalling one member on the other at their peripheries to provide a strong articulating joint therebetween and enabling relative oscillation thereof, an oscillatable input shaft substantially concentric with said members, a multilobe cam on said shaft, a plurality of separate toothed elements articulated relative to one another disposed around said cam engageable at times thereby, and internal annularly arranged teeth on said members engaged by said toothed elements when the latter are urged outwardly by the lobes of said cam, the number of teeth on said members being different whereby rotation of said cam and the interaction of said teeth and toothed members enforces oscillation of said members relative to each other.

3. A rotary mechanism comprising a substantially cylindrical reaction member and a substantially cylindrical output member concentric therewith, means journalling one member on the other at their peripheries to provide a strong articulating joint therebetween and enabling relative oscillation thereof, an oscillatable input shaft substantially concentric with said members, a rotor on said shaft, a plurality of separate toothed elements movable relative to each other and arranged around said rotor, said members each being internally toothed for engagement at times by one or more of said toothed elements, said toothed elements bridging across the teeth of the several members, and said rotor being movable to bring about intermittent engagement of said toothed members with the teeth of said elements, at a plurality of portions around the circumference of said members.

4. A rotary mechanism comprising alternate fixed and movable members in end-to-end relation, bearing means between adjacent members supporting one relative to the other, means securing said fixed members together, means securing said movable members together for joint oscillation relative to said fixed members, speed reducer means within said members having an oscillatable relatively high speed power input element and having plural elements connected to said input element and to said members, said plural elements interconnecting said members at a plurality of portions around the circumference thereof to enforce relative oscillation thereof upon oscillation of said input element.

5. A rotary power mechanism comprising a fixed hollow annular member in tandem relation to a movable hollow annular member, said members being journalled on one another by an annular bearing, a drive shaft entering into the hollows of said members, said members comprising differentially toothed ring gears, a plurality of separate segmental toothed elements each having teeth to mesh with respective ring gears, said toothed elements being in consecutive chain-like arrangement and being articulatable relative to one another, and cam means within said toothed elements, drivably connected to said drive shaft and rotatable relative to said toothed elements, having a plurality of cam lobes connected to enforce different ones of said toothed elements into engagement with said ring gears.

6. A mechanism according to claim 5, including means to secure said toothed elements to one another in articulating relation.

7. A rotary power mechanism comprising a fixed annular hollow member in tandem relation to a movable annular hollow member, said members being journalled on one another by an annular bearing, said members respectively including internal annular toothed tracks of different effective diameter to receive reaction and driving effort, separate elements bridging said members each having teeth engageable with and matched to respective toothed tracks, and a rotatable multi-lobe cam disposed within said members and elements, connected to said elements to enforce sequential engagement of the teeth of said elements with said toothed tracks.

8. A rotary speed reducing actuator comprising coaxial internally toothed substantially cylindrical members in end-to-end relation, bearing means between said members by which they are mutually journalled, a plurality of separate toothed elements within said members substantially co-extensive in length with the teeth of said members, a plurality of said toothed elements simultaneously engageable with the teeth of said members at spaced-apart zones around the members, there being different numbers of teeth on said members, and rotatable means within said members to enforce the engagement of teeth of said elements with the teeth of said members.

References Cited in the file of this patent

UNITED STATES PATENTS

| 1,543,791 | Pitter | June 30, 1925 |
| 2,402,756 | Lawler | June 25, 1946 |
| 2,838,952 | Seeliger | June 17, 1958 |
| 2,906,143 | Musser | Sept. 29, 1959 |

OTHER REFERENCES

Harmonic Drive, United Shoe Machine Co. pamphlet (received in Div. 12, April 10, 1958).